United States Patent
Tang et al.

(10) Patent No.: US 7,929,056 B2
(45) Date of Patent: Apr. 19, 2011

(54) USER INTERFACE WITH TILING OF VIDEO SOURCES, WIDESCREEN MODES OR CALIBRATION SETTINGS

(75) Inventors: William Tang, Corvallis, OR (US); Timothy J Corbett, Corvallis, OR (US); Robert M. Schneider, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1823 days.

(21) Appl. No.: 10/990,662

(22) Filed: Nov. 16, 2004

(65) Prior Publication Data

US 2006/0059513 A1 Mar. 16, 2006

Related U.S. Application Data

(60) Provisional application No. 60/609,585, filed on Sep. 13, 2004.

(51) Int. Cl.
*H04N 5/46* (2006.01)
(52) U.S. Cl. ........................................................ 348/556
(58) Field of Classification Search .................... 725/42, 725/44, 45, 47, 48, 50, 54, 59
See application file for complete search history.

(56) References Cited

U.S. PATENT DOCUMENTS

| | | | |
|---|---|---|---|
| 5,146,335 A * | 9/1992 | Kim et al. | 348/564 |
| 5,452,012 A * | 9/1995 | Saitoh | 725/56 |
| 5,621,456 A * | 4/1997 | Florin et al. | 725/43 |
| 5,712,995 A * | 1/1998 | Cohn | 715/792 |
| 5,900,868 A * | 5/1999 | Duhault et al. | 725/42 |
| 6,003,041 A | 12/1999 | Wugofski | |
| 6,020,930 A * | 2/2000 | Legrand | 725/41 |
| 6,177,931 B1 * | 1/2001 | Alexander et al. | 725/52 |
| 6,292,283 B1 * | 9/2001 | Grandbois | 398/107 |
| 6,445,834 B1 | 9/2002 | Rising | |
| 6,549,674 B1 | 4/2003 | Chui et al. | |
| 6,577,311 B1 | 6/2003 | Crosby et al. | |
| 6,608,633 B1 * | 8/2003 | Sciammarella et al. | 715/700 |
| 6,724,403 B1 | 4/2004 | Santoro et al. | |
| 7,304,685 B2 * | 12/2007 | Park et al. | 348/556 |
| 2002/0041287 A1 | 4/2002 | Engeldrum et al. | |
| 2002/0067433 A1 * | 6/2002 | Yui et al. | 348/588 |
| 2002/0080168 A1 | 6/2002 | Hilliard et al. | |
| 2002/0196264 A1 * | 12/2002 | Goetz | 345/611 |
| 2003/0005431 A1 * | 1/2003 | Shinohara | 725/12 |
| 2003/0011712 A1 * | 1/2003 | Matey | 348/565 |
| 2003/0020671 A1 | 1/2003 | Santoro et al. | |
| 2004/0078814 A1 * | 4/2004 | Allen | 725/47 |
| 2004/0128317 A1 | 7/2004 | Sull et al. | |
| 2004/0131249 A1 | 7/2004 | Sandrew | |
| 2004/0131330 A1 | 7/2004 | Wilkins et al. | |
| 2004/0145593 A1 | 7/2004 | Berkner et al. | |
| 2004/0243940 A1 * | 12/2004 | Lee et al. | 715/744 |
| 2004/0263686 A1 * | 12/2004 | Kim | 348/556 |
| 2005/0117654 A1 * | 6/2005 | Im | 375/240.26 |
| 2005/0125357 A1 * | 6/2005 | Saadat et al. | 705/57 |
| 2005/0149969 A1 * | 7/2005 | Kumar et al. | 725/40 |
| 2005/0180858 A1 * | 8/2005 | Halgas | 417/53 |

FOREIGN PATENT DOCUMENTS

| | | |
|---|---|---|
| EP | 0 557 033 A | 8/1993 |
| EP | 0 617 556 A | 9/1994 |
| JP | 07/135614 | 5/1995 |
| JP | 2003-052060 A | 2/2003 |

* cited by examiner

*Primary Examiner* — Brian T Pendleton
*Assistant Examiner* — Cai Chen

(57) ABSTRACT

A user interface for a television or receiver associated with the television includes a display of tiles representing options available to a user, and controls for selecting one of the displayed tiles to select a corresponding option.

19 Claims, 10 Drawing Sheets

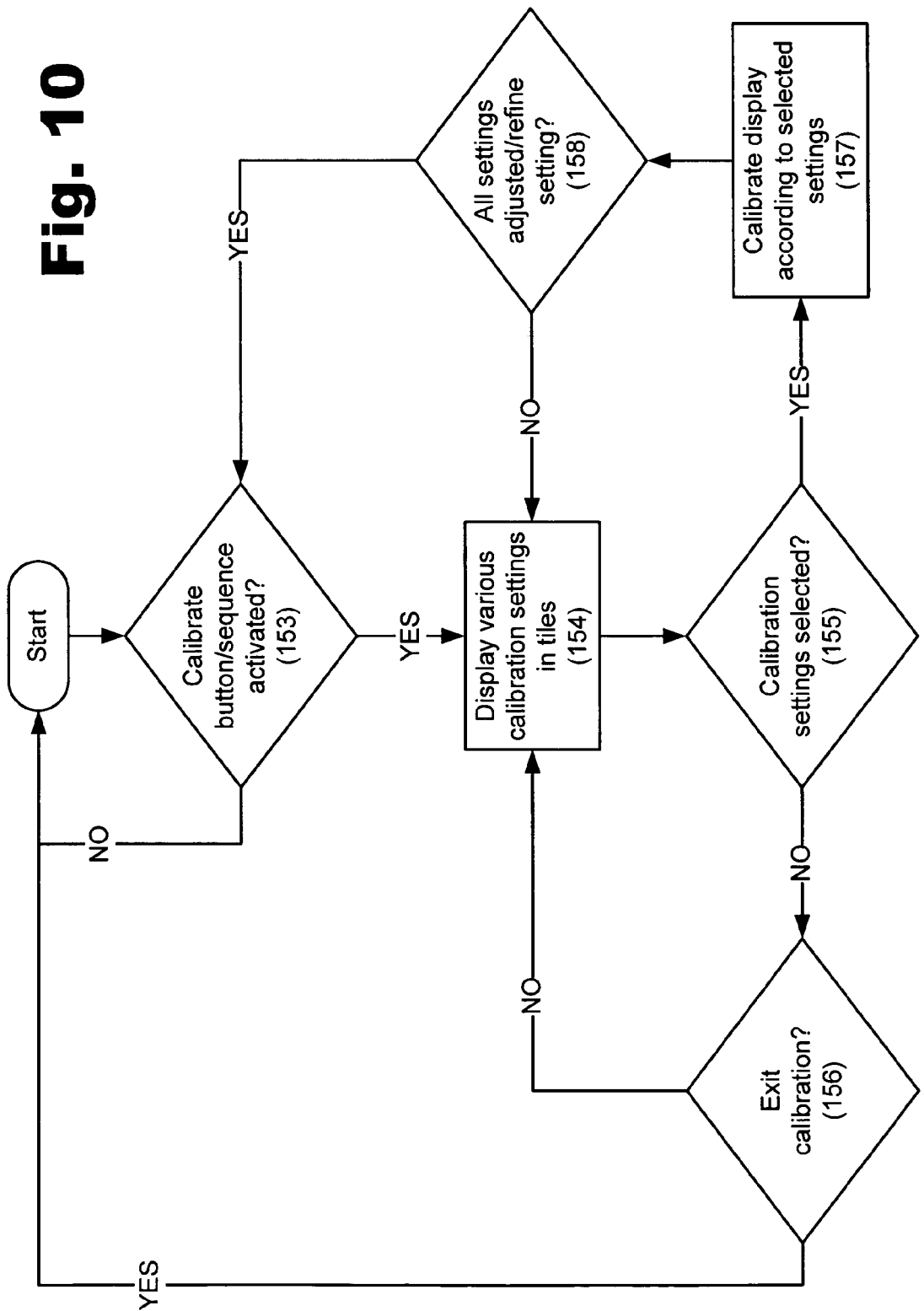

USER INTERFACE WITH TILING OF VIDEO SOURCES, WIDESCREEN MODES OR CALIBRATION SETTINGS

This application claims the benefit of U.S. Provisional Application No. 60/609,585, filed Sep. 13, 2004, which is hereby incorporated by reference.

BACKGROUND

In most video or home entertainment systems, a television or video monitor is used to watch broadcast and recorded television programming. Such programming may be enjoyed for its entertainment, educational or informational value.

A broadcast signal carrying programming shown on the television set may come from, for example, a terrestrial antenna, a cable television system, or a satellite dish. Modern users may have access to hundreds of channels of programming as well as pay-per-view service, video-on-demand service and other services.

A wide variety of recorders, players and similar video equipment can also provide a video signal for display on the television set or video monitor. Thus, a user can watch recorded programming as well as broadcast programming.

SUMMARY

A user interface for a television or receiver associated with the television includes a display of tiles representing options available to a user, and controls for selecting one of the displayed tiles to select a corresponding option.

BRIEF DESCRIPTION OF THE DRAWINGS

The accompanying drawings illustrate various embodiments of the present invention and are a part of the specification. The illustrated embodiments are merely examples of the present invention and do not limit the scope of the invention.

FIG. 10 is a flowchart describing a method of operating the user interface and system described with reference to FIG. 9.

Throughout the drawings, identical reference numbers designate similar, but not necessarily identical, elements.

DETAILED DESCRIPTION

As noted above and as shown in FIG. 1, a video or home entertainment system typically includes a television set (100) or other video monitor. As used herein and in the appended claims, the term "television" or "television set" will refer broadly to any television set or video monitor on which a video signal can be displayed, including but not limited to, cathode ray tube devices, Rear Projection Televisions (RPTV), other projection systems, liquid crystal displays, plasma monitors and other flat panel displays.

Figure 1:
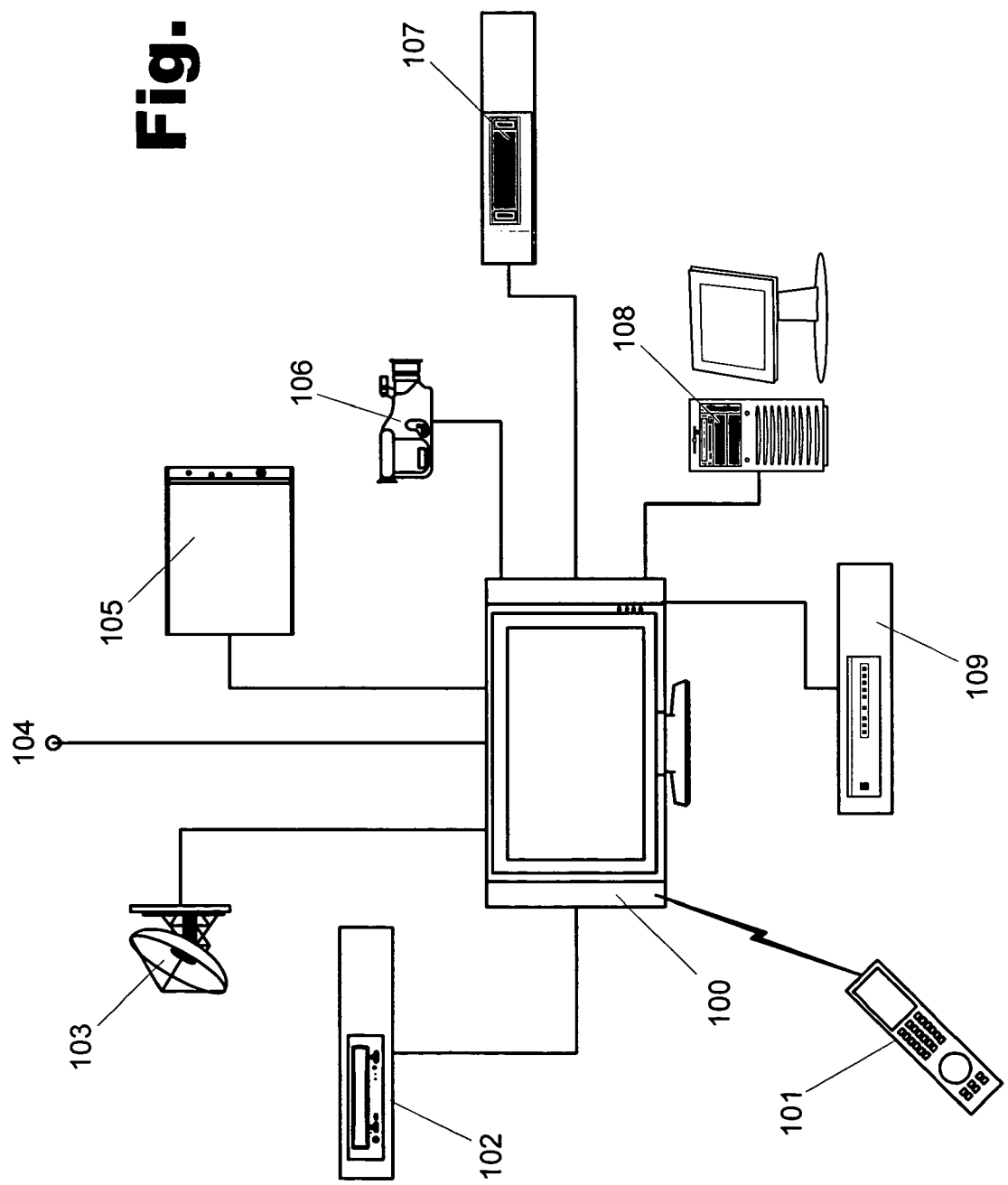
FIG. 1 is a diagram of a video or home entertainment system according to principles described herein.

A variety of video sources may provide a user with video programming for display on the television set. As illustrated in FIG. 1, such video sources may include, but are not limited to, a cable television system (104), a satellite dish (103) in communication with a satellite broadcasting system, a video game system (105), a Digital Video Disc (DVD) player (102), a video cassette recorder (VCR) (107), a video camera or camcorder (106), a personal video recorder (PVR) or digital video recorder (DVR) (109) or a computer (108). As used herein and in the appended claims, a "video source" or "source" refers broadly to any device or system outputting a video signal for display on a television set or for recording on a recording device.

As shown in FIG. 1, an array of video sources (102-109) may be connected to, and provide a video signal to, the television set (100). The television set (100) may be controlled with a user input device on the television itself, such as a keypad or buttons. Additionally, the television set (100) may be controlled using a remote control unit (101). The remote control unit (101) communicates wirelessly with the television set (100) to send user input and commands entered on the remote control unit (101) to the television set (100). The remote control unit (101) may communicate with the television set (100) or other system component using, for example, an infra-red signal or a radio frequency (RF) signal.

As will be apparent from FIG. 1, the user can choose from a wide variety of sources. The user can select from which source (102-109) to take the signal that is displayed on the television set (100). This is typically done by controlling the television set (or a receiver as will be described below) with the remote control unit (101). However, with such a wide variety of sources to choose from, it may be difficult for the user to identify and select the video source the user desires to watch.

The television set (101) will typically include a number of video inputs to which different signal sources can be connected. These inputs may be designated, for example, "video 1," "video 2," "video 3," "video 4," etc. In some systems, the inputs may be designated by the type of source to be connected to that input. Thus, the various sets of inputs may be designated, for example, as "satellite," "DVD," "game system," etc.

However, if the user connects a different type of video source than that designated, the television (101) will likely have no means of determining that the video source is other than that designated. This may make it even more difficult for a user to find and select the particular video source desired at a particular time.

Figure 2:
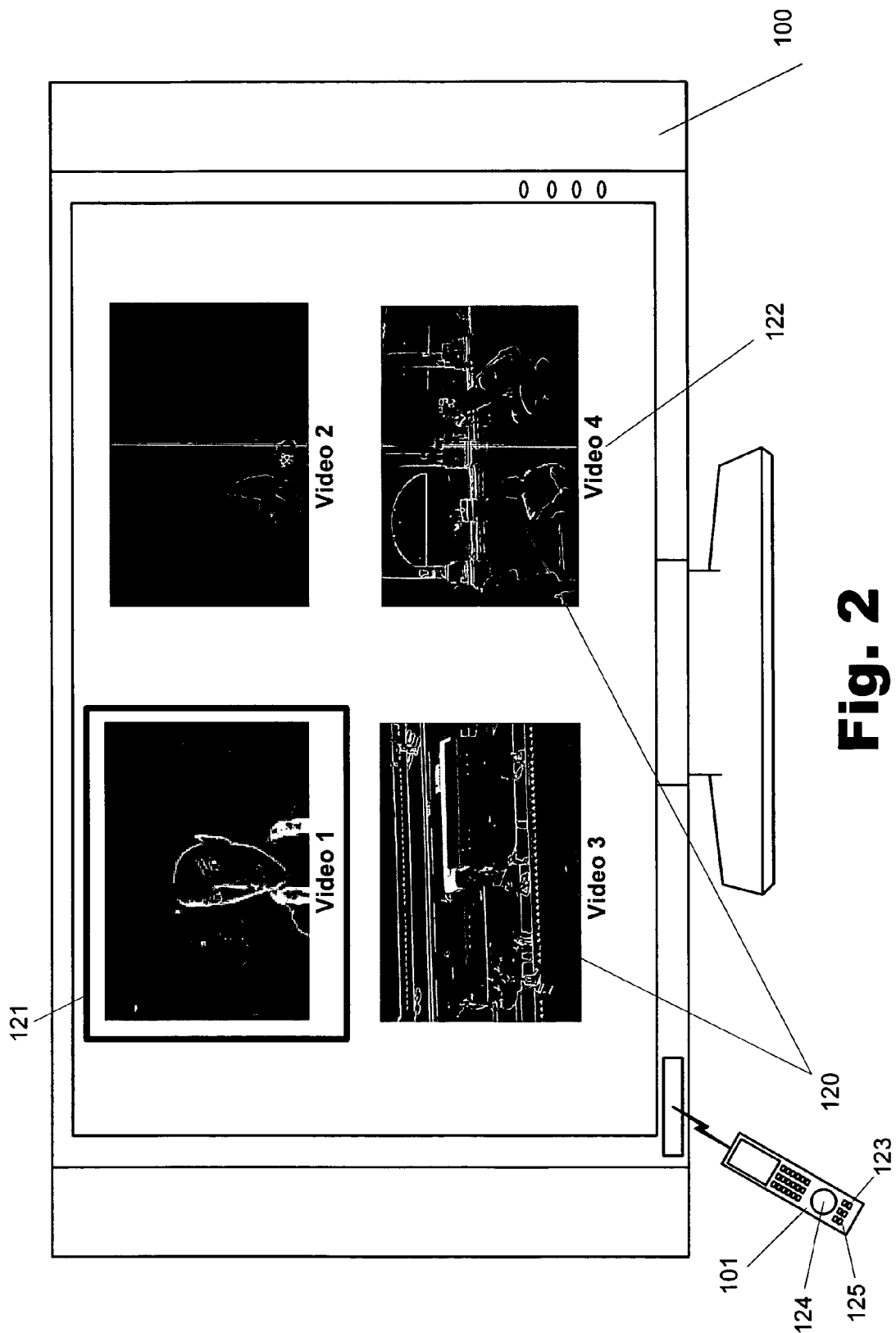
FIG. 2 is an illustration of a user interface with tiling of video sources according to principles described herein.

Consequently, a user interface will be described herein that facilitates the selection of a desired signal source. FIG. 2 is an illustration of such a user interface with tiling of video sources according to principles described herein. As shown in FIG. 2, a principal portion of the user interface described is displayed on the screen of the television set (100). The user interface includes a tiled display of the various signal sources available, meaning that the user interface includes a number of windows or tiles (120) arranged on the screen of the television set (100). In each tile (120), the user interface displays the motion picture from the video signal being received from a corresponding video source. This is like the user having a number of different television sets so that all incoming video sources can be watched simultaneously. However, the tiles are all included in one user interface, similar to the Picture-in-Picture feature on some televisions. In some examples, the user sees a full-motion video feed in each of the tiles (120) from the video source represented by that tile. In other examples, the image from the video source is continuously updated in the corresponding tile (120) to alternatively provide real-time dynamic video from each video source. Real-time videos can be accomplished in this manner by using the scalar, video capturer/renderer, which is in the microprocessor (111, FIG. 4) of the television (100), to rapidly parse from one video source to the next or similarly, from one setting (e.g. widescreen) to the next. Consequently, the user can see what programming is being received from each video source and thus readily select the video source desired.

In the example shown in FIG. 2, the television set (100) is connected to four different video sources. Thus, four different windows or tiles (120) are displayed, each representing and displaying the video signal from a particular video source. This is referred to herein as tiling because each video source is represented by a separate window or tile, with a number of windows or tiles being arranged over the screen of the television (100) to form the on-screen portion of the user interface.

The various tiles (130) may be labeled (122) according to the corresponding set of inputs through which the television (100) is receiving the signal from that video source. Thus, the four tiles (120) illustrated in FIG. 2 are labeled as "Video 1," "Video 2", "Video 3" and "Video 4." While such labels (122) may not be particularly helpful in finding the desired video source, seeing the programming from that video source in a corresponding tile (120) makes it easy for the user to select the desired video source.

A box (121) or other highlight or indicator in the user interface will indicate one of the various tiles, for example, the upper left tile labeled "Video 1" in FIG. 2. This box (121) may be moved from tile to tile (120) using, for example, the buttons (124) or other input devices on the remote control unit (101). When a selection or "enter" button (125) is activated on the remote control unit (101), the source represented by the tile then indicated by the box (121) is selected and the signal from that source is displayed on the television (100), for example, Video 1 in FIG. 2. Typically, the entire screen of the television (100) is then devoted to display of the programming from the selected source.

Alternatively, each of the tiles (120) may be numbered. The desired tile is then indicated by the user inputting the number associated with that tile, for example, into the remote control unit (101).

A dedicated button (123) on the remote control unit (101) may be used to invoke the user interface described. Thus, when a user activates the "source select" button (123), the user interface described is invoked in which the various available sources are represented by tiles (120). A different video source can then be selected, as described. In some embodiments, the source select button (123) can be activated again to return the system to displaying the video source that was being displayed before the source select button (123) was activated.

Figure 3:
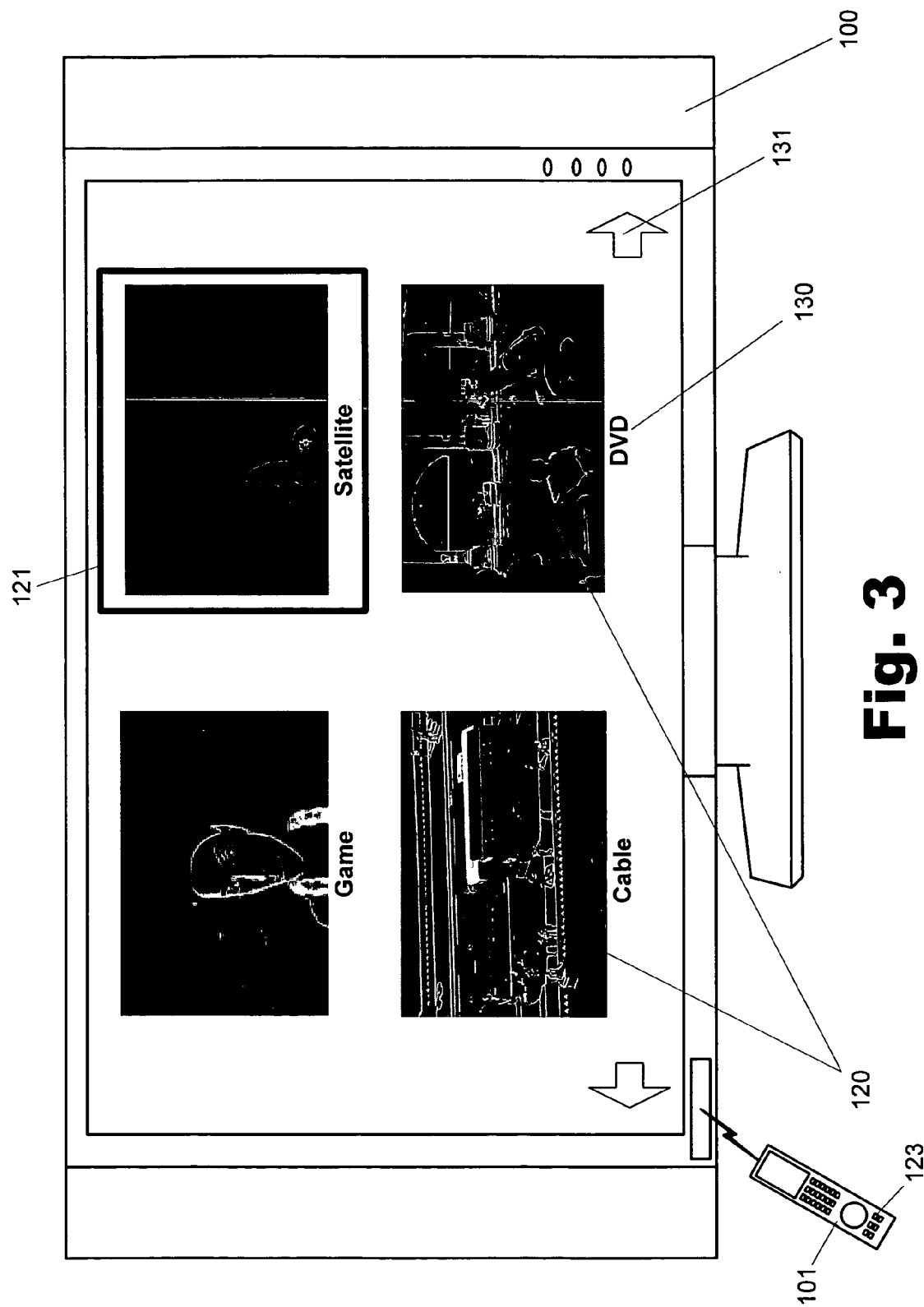
FIG. 3 is an illustration of an alternate user interface with tiling of video sources according to principles described herein.

FIG. 3 is an illustration of an alternate user interface with tiling of video sources and additional features according to principles described herein. As shown in FIG. 3, the various tiles (120) can be labeled to give some indication of the type of video source represented. This is accomplished by designating a particular video input as being, for example, for a game system, and having a game system connected to that video input. Thus, the tiles (120) in FIG. 3 are labeled, starting at the top left and moving clockwise, "Game," "Satellite," "DVD" and "Cable." These labels (130) may help the user identify the desired video source.

Additionally, there may be more than four video sources available. Consequently, in some embodiments, there may be more than four tiles shown on the user interface screen. In other embodiments, there may be two or more pages of tiles, so that a tile is provided to presented each and ever available video source. In such an example, the size of the tiles is not decreased to accommodate a higher number of tiles. Thus, it remains easy for the user to observe and recognize the video programming being shown in any particular tile representing a corresponding video source.

In the example illustrated in FIG. 3, there are multiple pages of tiles (120) representing more than four video sources. Consequently, page arrows (131) may be added to the interface so that a user can move between pages of tiles (120). By highlighting and selecting a page arrow (131), using for example the box (121) controlled by the remote control unit (101), the user interface is caused to display a different page of tiles (120). Thus, any number of video sources may be represented by any number of tiles on multiple pages.

Figure 4:
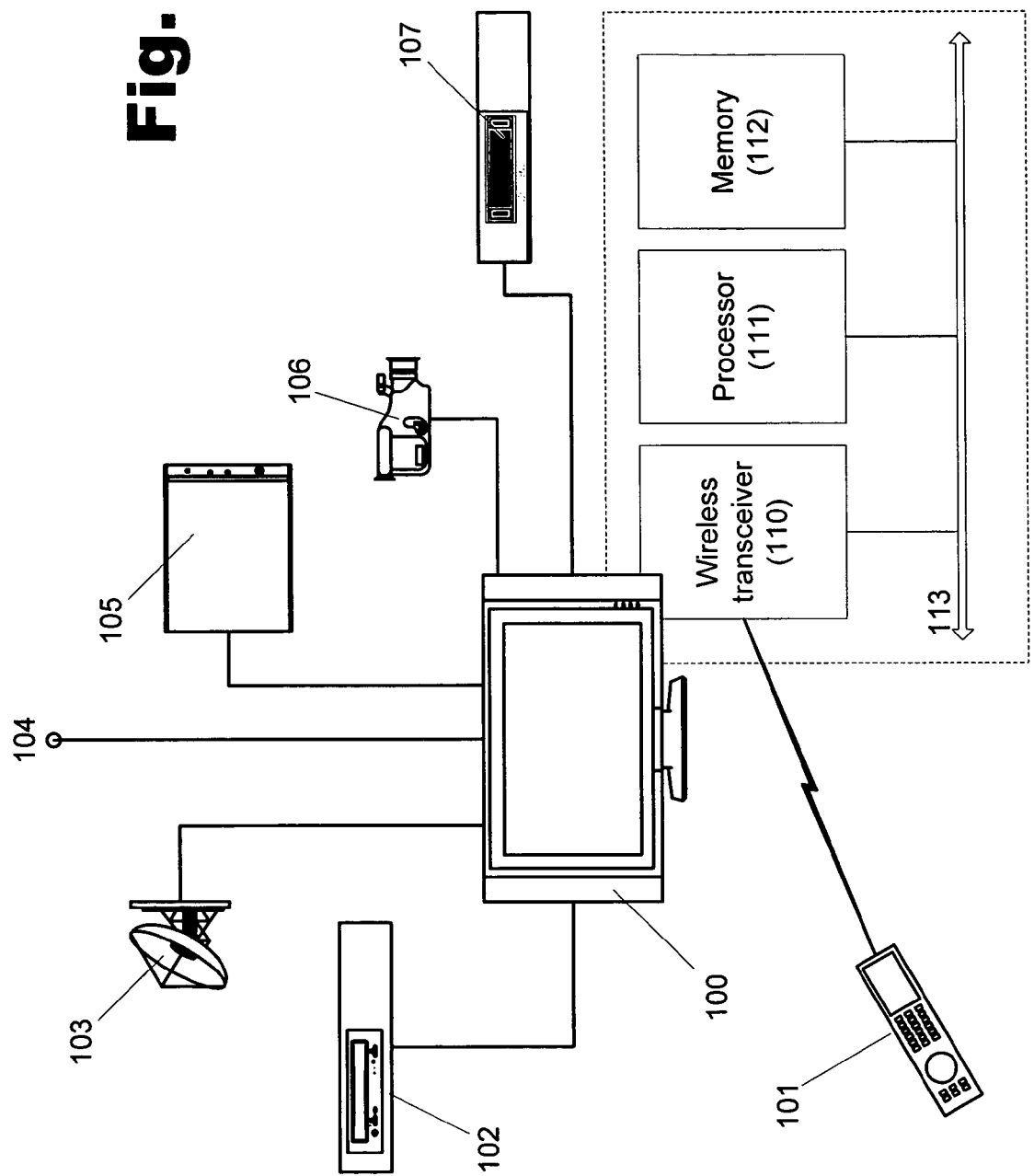
FIG. 4 is a diagram of a video or home entertainment system with a television set according to principles described herein.

FIG. 4 is a diagram of a video or home entertainment system with a television set according to principles described herein. FIG. 4 specifically illustrates principal internal components of a television set (100) as described above.

As shown in FIG. 4, the television set (100) includes a wireless transceiver (110) for communicating with the remote control unit (101). The television set (100) also includes a processor (111) and a memory unit (112). A system bus (113) interconnects the various components of the television set (100).

Firmware or electronic programming, stored in the memory unit (112) and executed by the processor (111), provide the television set (100) with the user interface and all the consequent functionality as described in this specification. Additional user interface features will be described below. However, it will be understood that all the user interface features and functions described in this specification may be achieved, in part, with appropriate programming for the processor (111) illustrated in FIG. 4.

Figure 5:
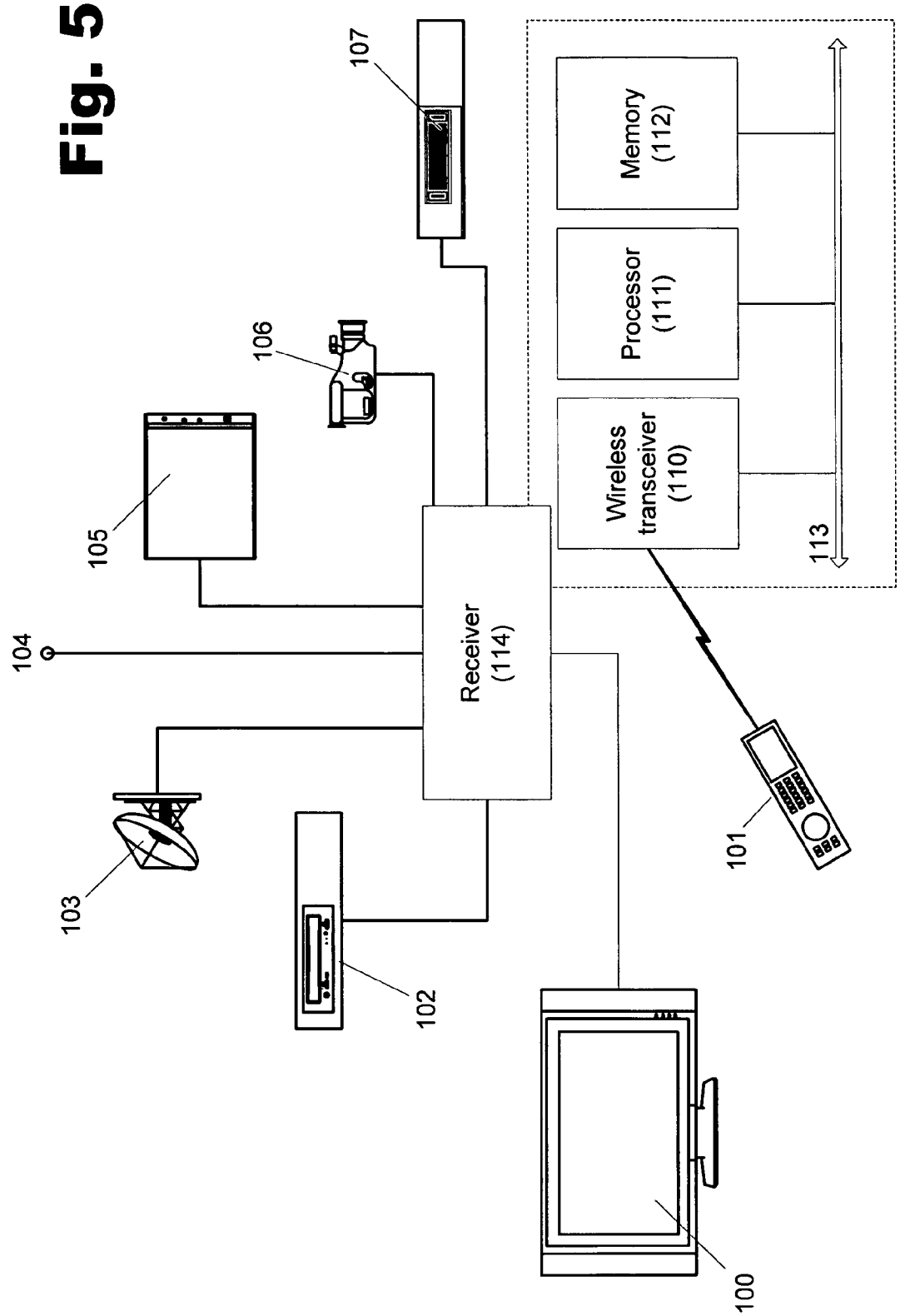
FIG. 5 is a diagram of a video or home entertainment system with a receiver according to principles described herein.

FIG. 5 is a diagram of a video or home entertainment system with a receiver according to principles described herein. As will be understood, the user interface described above, may be supported by a receiver (114), rather than the television set (100).

In the example of FIG. 5, a receiver (114) is connected to any or all of the available video sources (e.g., 102-107). The receiver (114) selectively outputs the video signal from one of the sources to the television set (100) for display on the television set (101). Thus, the receiver (114) may produce the user interface described herein, display the on-screen portions of the user interface on the television set (100) and receive user input from a wireless remote control unit (101).

Consequently, as shown in FIG. 5, the receiver (114) includes a wireless transceiver (110) for communicating with the remote control unit (101). The receiver (114) also includes a processor (111) and a memory unit (112). A system bus (113) interconnects the various components of the receiver (114).

Firmware or electronic programming, stored in the memory unit (112) and executed by the processor (111) provide the receiver (114) with the user interface and all the consequent functionality as described in this specification. Additional user interface features will be described below. However, it will be understood that all the user interface features and functions described in this specification may be achieved, in part, with appropriate programming for the processor (111) of the receiver (114) illustrated in FIG. 5.

Figure 6:
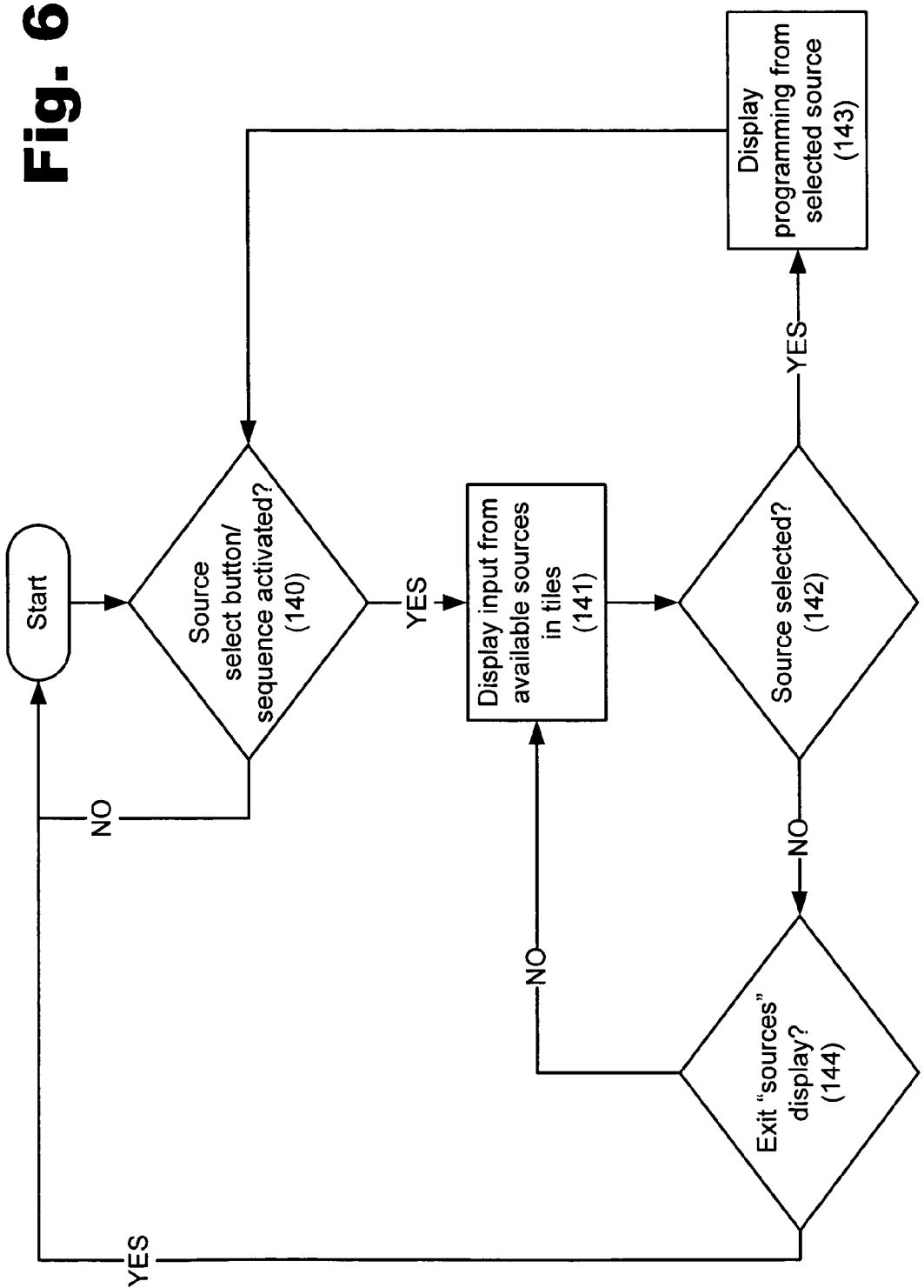
FIG. 6 is a flowchart describing a method of operating the user interfaces and system described with reference to FIGS. 1-5.

FIG. 6 is a flowchart describing a method of operating the user interfaces and system described with reference to FIGS. 1-5. As shown in FIG. 6, the user interface is invoked when a "source select" button or sequence of buttons is activated, for example, on a corresponding remote control unit (determination 140). The user interface described above is then displayed (step 141) with a tile representing each available video source and displaying programming being received from that source.

The user can then move an indicator among the tiles of the interface until a tile representing a desired video source is indicated. When the user selects an indicated tile and corresponding video source (determination 142), the corresponding video source is selected and the programming from that video source is displayed (step 143). If the user does not wish to select a new video source, the user can opt to exit the user interface and discontinue displaying the tiles for different video sources (determination 144).

Figure 7:
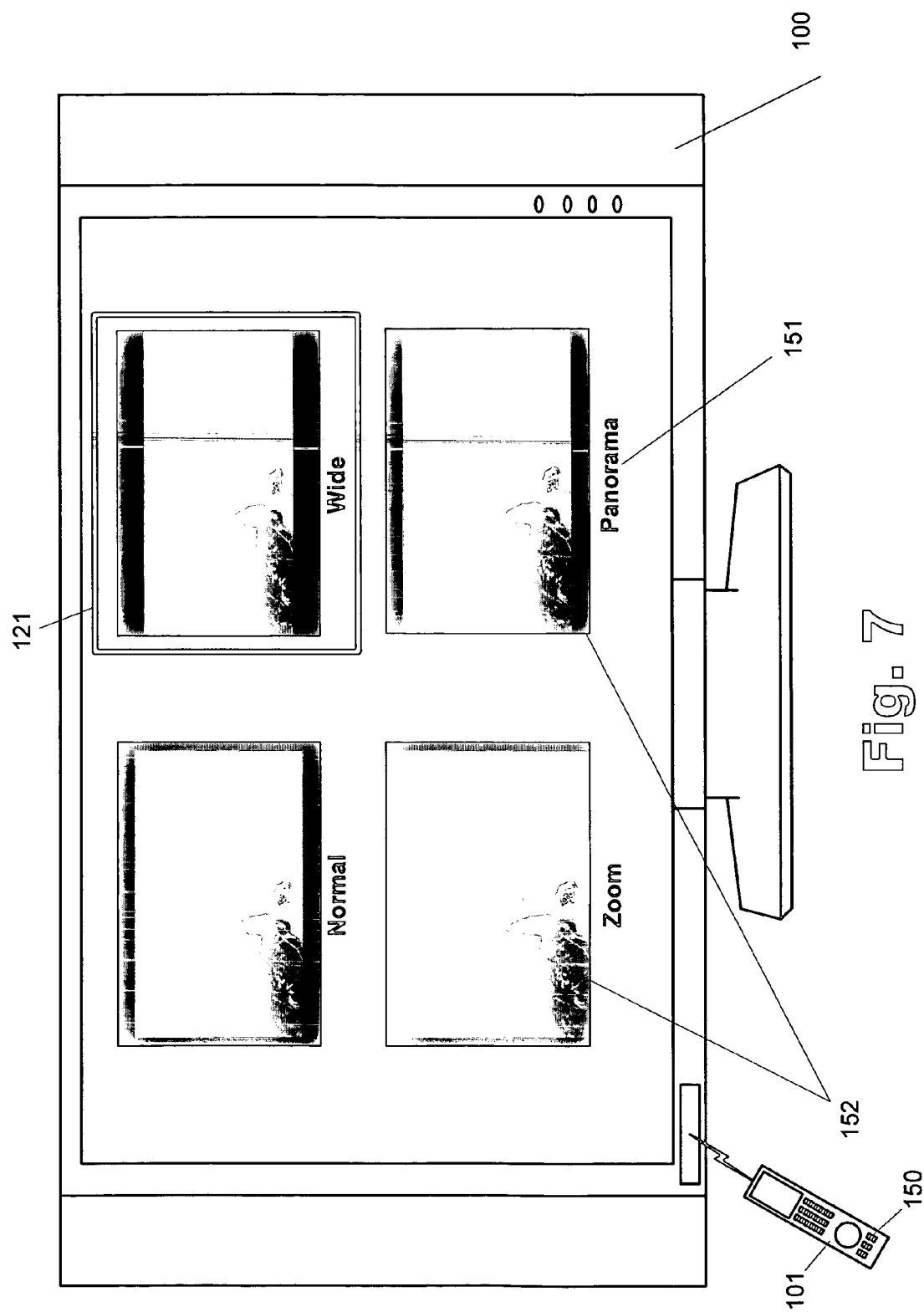
FIG. 7 is an illustration of a user interface with tiling of widescreen modes according to principles described herein.

FIG. 7 is an illustration of a user interface with tiling of widescreen modes according to principles described herein. As will be appreciated by those skilled in the art, there are a number of various widescreen formats in which video programming may be presented. These widescreen formats include, but are not limited to, 16:9, letterboxed DVDS, Pillar Boxed ATSC streams, and cinemas wide DVDs. Pillar Boxed ATSC streams, and cinema wide DVDs. Consequently, it is hard for users to select the most optimal widescreen viewing mode. Constantly, users complain about the black bars, horizontal and vertical, that appear depending on the input and widescreen mode chosen.

Previously, some television sets have had various widescreen modes available that can be cycled through in a serial manner. Some televisions display a list of widescreen modes that the users can scroll through to select a widescreen mode. However, the names of the widescreen modes in such a list are arbitrary, for example, "wide1," "wide2," "zoom1," "panorama," etc., and mean very little to the user. Moreover, it is very difficult to compare different widescreen modes to determine which the user prefers.

Consequently, the user interface shown in FIG. 7 provides a number of tiles (152) each of which represents a different widescreen mode and shows how that widescreen mode would look as if the tile were the entire screen of the television set (100). The video signal shown in the tiles of FIG. 7 may be the incoming program from a selected video source or may be a still picture or video clip stored in the memory of the television set (100) or receiver (114, FIG. 5). As shown in FIG. 7, each of the various widescreen modes may also be labeled (151). Starting at the upper left and moving counterclockwise, the labels for the tiles in the example of FIG. 7 are "Normal," "Wide," "Panorama" and "Zoom."

A box (121) or other highlight or indicator in the user interface will indicate one of the various tiles, for example, the upper left tile labeled "Wide" in FIG. 7. As described above, this box (121) may be moved from tile to tile (152) using, for example, the buttons (124) or other input devices on the remote control unit (101). When a selection or "enter" button (125) is activated on the remote control unit (101), the widescreen mode represented by the tile then indicated by the box (121) is selected. The television (100) then displays selected programming using that selected widescreen mode, for example, "Wide" in FIG. 7.

A dedicated button (150) on the remote control unit (101) may be used to invoke the widescreen mode selection feature of the user interface described. Thus, when a user activates the "widescreen select" button (150), the user interface as described is invoked in which the various widescreen modes available are represented by tiles (152). A desired widescreen mode can then be selected. A comparison of the various widescreen modes available is also facilitated by having representations of the various available widescreen modes displayed side-by-side. In some embodiments, the widescreen select button (125) can be activated again to exit the user interface without changing the current widescreen mode.

Figure 8:
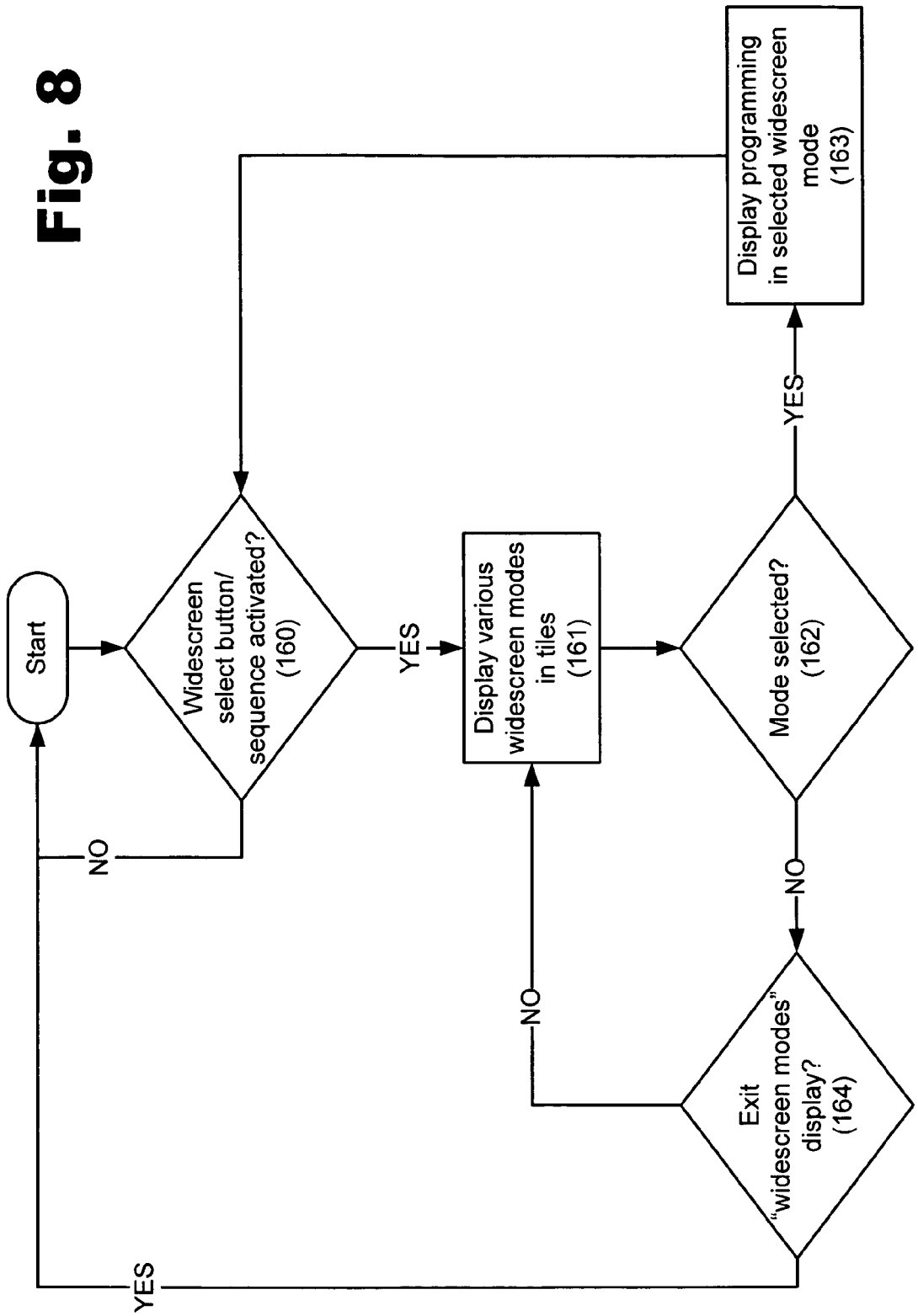
FIG. 8 is a flowchart describing a method of operating the user interface and system described with reference to FIG. 7.

FIG. 8 is a flowchart describing a method of operating the user interface and system described with reference to FIG. 7. As shown in FIG. 8, the user interface is invoked when a "widescreen select" button or sequence of buttons is activated, for example, on a corresponding remote control unit (determination 160). The user interface described above is then displayed (step 161) with a tile representing each available widescreen mode.

The user can then move an indicator among the tiles of the interface until a tile representing a desired widescreen mode is indicated. When the user selects an indicated tile and corresponding widescreen mode (determination 162), the corresponding widescreen mode is selected and the programming on the television set is displayed in that widescreen mode (step 163). If the user does not wish to select a new widescreen mode, the user can opt to exit the user interface and discontinue displaying the tiles for different widescreen modes (determination 164). As described above, the firmware allowing a user to select a desired widescreen mode can be stored in the memory (112, FIG. 4) of the television set (100).

A method of, and user interface for, calibrating the television set (100) will now be described. To get the best picture from a particular television (100) under a particular set of ambient conditions, there are a number of calibration settings that can be adjusted in the user interface of the television (100). These calibration settings include color, brightness, contrast, hue, etc.

Users often have trouble calibrating their television sets to their home viewing environment. Conventional display calibration involves a calibration DVD with numerous steps involving pattern matching with a reference image. Calibration DVDs display special test patterns that are supposed to look like a certain reference image, sometimes with the use of a color filter. The user is supposed change one or more particular settings on the television, for example, by sliding a slider bar, until the test pattern matches the reference image. Consequently, few users bother to calibrate their television for optimal picture quality. Even with the calibration DVD, matching the correct color requires judgment that differs between people.

Figure 9:
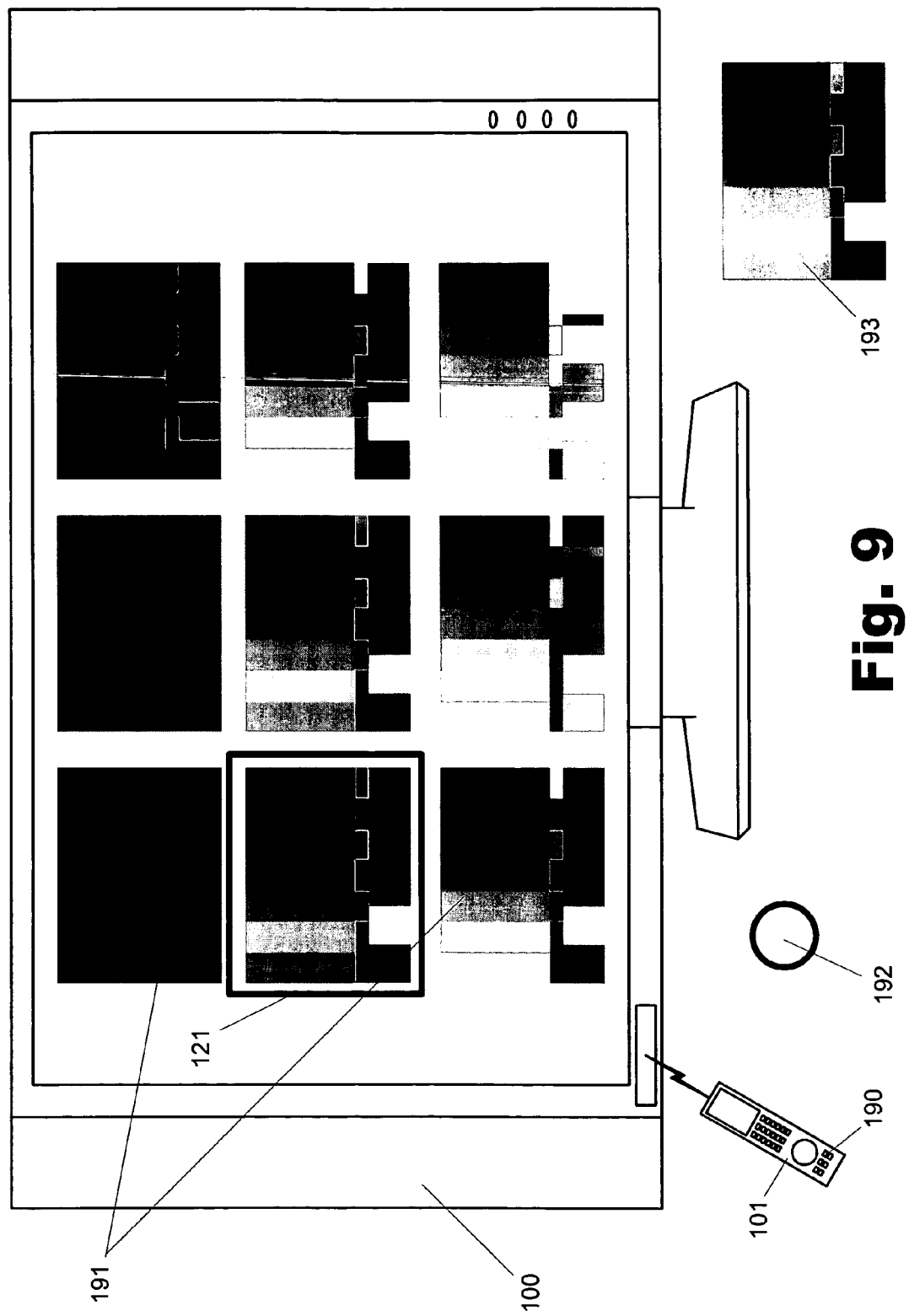
FIG. 9 is an illustration of a user interface with tiling of calibration settings according to principles described herein.

FIG. 9 is an illustration of a user interface with tiling of a range of calibration settings according to principles described herein. As shown in FIG. 9, a number of tiles (191) are displayed. Each tile represents a different value for a particular calibration setting for the television (100), for example, hue. The various tiles (191) thus represent the full range of hue (or other calibration settings) available on the television set (100).

Viewing the tiles (191), the user then selects the tile that is closest in appearance to a reference image on a card (193). This is done using, for example, the buttons on the remote control unit (101) to move a box (121) or other indicator among the tiles (191) before activating a selection button in the manner described above. When selecting the best matching tile (191), the user may view the user interface on the screen of the television (101) through a filter (192) (red, green, blue, or some proprietary filter).

In some embodiments, when a selection is made, another set of tiles (191) is then displayed representing a narrower range of values for the particular calibration setting being adjusted. This narrower range of values may be centered on the value represented by the calibration tile selected on the previous user interface screen. Through this iterative process, the calibration of the television (100) may be further refined.

After one calibration setting is optimized based on the reference image (193), another set of tiles (191) can be displayed representing the range of settings for a different calibration setting, for example, brightness. This process is continued until all the various calibration settings have been matched to a reference image and optimized by the user's selections. Thus, using the user's selections, the television (100) can optimize the display image based on the surrounding environment or ambient conditions.

This calibration process can be invoked, for example, by pressing a dedicated button (190) or sequence of buttons on the remote control unit (101). Alternatively, the calibration process may be invoked by activating a button or other user input device on the television (100) itself.

Thus, instead of using a calibration DVD, which is not always handy, the television (100) has the calibration setting feature built-in. As described above, the calibration tiles (191) and the firmware allowing a user to control the calibration settings as described can be stored in the memory (112, FIG. 4) of the television set (100). Additionally, instead of having the user manually tweak an image setting using a slider bar or the like, the television simply displays the possible range of calibration settings and allows the user chooses from the selection of tiled images that image which looks most closely like the reference image (193).

FIG. 10 is a flowchart describing a method of operating the user interface and system described with reference to FIG. 9. As shown in FIG. 10, the calibration user interface is invoked when a "calibration" button or sequence of buttons is activated, for example, on a corresponding remote control unit (determination 153). The user interface described above is then displayed (step 154) with tiles representing a range of values for a particular calibration setting.

The user can then move an indicator among the tiles of the interface to select the tile that most closely matches a reference image. When the user selects an indicated tile and corresponding calibration setting (determination 155), that calibration setting is selected and the display on the television set is adjusted according to that calibration setting (step 157). As described above, this process can be iterated (determination 158) to refine a particular calibration value and/or to select a value for each available calibration setting. If the user does not wish to complete the calibration process, once invoked, the user can opt to exit the user interface (determination 156).

It should also be noted that tiles do not have to be oriented in a matrix or array pattern as shown in FIGS. 2, 3 and 7. Alternatively, the tiles (120) can be graphically overlapped like papers on a table with corners of the videos showing. The tiles (120) can also be oriented in a circular pattern with a scroll wheel motion for selection. Any arrangement for the tiles (120) may be used within the user interface described herein.

The preceding description has been presented only to illustrate and describe embodiments of the invention. It is not intended to be exhaustive or to limit the invention to any precise form disclosed. Many modifications and variations are possible in light of the above teaching. It is intended that the scope of the invention be defined by the following claims.

What is claimed is:

1. A method of controlling a television or receiver associated with said television, said method comprising:
   displaying a number of tiles on display said television simultaneously, wherein each tile shows a video program, said tiles representing options available to a user; and
   selecting one of the displayed tiles to select a corresponding option;
   wherein each tile represents a different widescreen mode that can be displayed on said television.

2. The method of claim 1, further comprising moving an indicator among said tiles to select a tile representing a desired option using controls on a remote control unit.

3. The method of claim 1, further comprising invoking said display of tiles representing different widescreen modes with a button or sequence of buttons on a remote control unit.

4. The method of claim 1, further comprising associating each tile with a text label.

5. The method of claim 4, wherein said text labels indicate different video sources.

6. The method of claim 4, wherein said text labels indicate different widescreen modes for said television.

7. The method of claim 1, further comprising displaying multiple pages of tiles and moving between different pages of tiles.

8. A user interface for a television or receiver associated with said television, said user interface comprising:
   a simultaneous display of tiles on said television, wherein each tile shows a video program, each tile representing a different widescreen mode available on said television; and
   controls for selecting one of the displayed tiles to select a corresponding widescreen mode.

9. A user interface for a television or receiver associated with said television, said user interface comprising:
   a simultaneous display of tiles on said television, wherein each tile shows a video program, each tile representing a different value for a calibration setting for said television, the calibration setting effecting all of an image displayed by said television set, wherein said calibration setting comprises a calibration setting for at least one of: a color setting of said image on said television set, a brightness setting of said image on said television set, a contrast setting of said image on said television set and a hue setting of said image on said television set; and
   controls for selecting one of the displayed tiles to select a corresponding value for a calibration setting.

10. The user interface of claim 9, further comprising iterative displays of said tiles refining a selected value for a calibration setting.

11. The user interface of claim 9, further comprising multiple displays of tiles, each display corresponding to a different calibration setting.

12. The user interface of claim 11, wherein said calibration settings include color, hue and brightness.

13. The user interface of claim 9, further comprising a reference image to be matched to a tile of said display.

14. The user interface of claim 9, further comprising a filter through which a user views said display of tiles.

15. A method for controlling a television or receiver with a user interface to adjust calibration settings of said television or receiver, said method
comprising: displaying a plurality of tiles on display said television simultaneously, wherein each tile shows a video program, each tile representing a different value for a calibration setting for said television, the calibration setting effecting all of an image displayed by said television set, wherein said calibration setting comprises a calibration setting for at least one of: a color setting of said image on said television set, a brightness setting of said image on said television set, a contrast setting of said image on said television set and a hue setting of said image on said television set.

16. The method of claim 15, further comprising selecting one of the displayed tiles to select a corresponding value for a calibration setting.

17. The method of claim 16, further comprising selecting that displayed tile that most close resembles a reference image.

18. The method of claim 16, wherein, after said selecting one of the displayed tiles is performed, displaying a second plurality of tiles representing a narrower range of values for said calibration setting.

19. The method of claim 16, wherein, after optimizing a first calibration setting, displaying a second plurality of tiles representing values for a second calibration setting and selecting one of said second plurality of tiles to optimize said second calibration setting.

* * * * *

UNITED STATES PATENT AND TRADEMARK OFFICE
CERTIFICATE OF CORRECTION

| | | |
|---|---|---|
| PATENT NO. | : 7,929,056 B2 | |
| APPLICATION NO. | : 10/990662 | |
| DATED | : April 19, 2011 | |
| INVENTOR(S) | : William Tang et al. | |

It is certified that error appears in the above-identified patent and that said Letters Patent is hereby corrected as shown below:

In column 5, lines 32-35, delete "These widescreen formats include, but are not limited to, 16:9, letterboxed DVDS, Pillar Boxed ATSC streams, and cinemas wide DVDs. Pillar Boxed ATSC streams, and cinema wide DVDs." and insert -- These widescreen formats include, but are not limited to, 16:9, letterboxed DVDs, Pillar Boxed ATSC streams, and cinemas wide DVDs. --, therefor.

Signed and Sealed this
Twenty-second Day of November, 2011

David J. Kappos
*Director of the United States Patent and Trademark Office*